United States Patent [19]
Scott

[11] Patent Number: 5,920,402
[45] Date of Patent: *Jul. 6, 1999

[54] USE OF COMPRESSION TO IMPROVE THE SENDING OF FAXES OVER ANALOG CELLULAR

[75] Inventor: Robert Earl Scott, Indian Rocks Beach, Fla.

[73] Assignee: Paradyne Corporation, Largo, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/573,700

[22] Filed: Dec. 18, 1995

[51] Int. Cl.⁶ .................................................... H04N 1/01
[52] U.S. Cl. ........................................... 358/405; 358/400
[58] Field of Search .................................. 358/400, 405, 358/407, 426, 430, 432–433

[56] References Cited

U.S. PATENT DOCUMENTS

| | | | |
|---|---|---|---|
| 4,476,496 | 10/1984 | Thaler | 358/286 |
| 4,878,228 | 10/1989 | Takahashi | 375/3 |
| 5,021,890 | 6/1991 | Yoshida et al. | 358/405 |
| 5,065,254 | 11/1991 | Hishida | 358/400 |
| 5,123,033 | 6/1992 | Beck | 375/121 |
| 5,237,429 | 8/1993 | Zuiss et al. | 358/442 |
| 5,243,438 | 9/1993 | Anderson et al. | 358/426 |
| 5,263,078 | 11/1993 | Takahashi et al. | 379/58 |
| 5,282,238 | 1/1994 | Berland | 379/58 |
| 5,367,564 | 11/1994 | Sutoh et al. | 358/402 |
| 5,369,501 | 11/1994 | Wilson et al. | 358/407 |
| 5,371,607 | 12/1994 | Hannina et al. | 358/402 |
| 5,404,231 | 4/1995 | Bloomfield | 358/400 |
| 5,452,099 | 9/1995 | Von Meister | 358/403 |
| 5,513,212 | 4/1996 | Bremer | 375/222 |
| 5,752,199 | 5/1998 | Scott | 455/557 |

*Primary Examiner*—Thomas D Lee
*Assistant Examiner*—Stephen Brinich

[57] ABSTRACT

A Mobile Switching Center (MSC) includes a cellular modem pool that comprises a number of pairs of modems in which the data terminal equipment (DTE) ports of each modem pair are cross-connected in a "back-to-back" fashion. This allows the two modems of each pair to interchange data via their DTE ports and thereby isolate that portion of a cellular fax call over the cellular communications channel from that portion of the cellular fax call through the PSTN. Fax information is transmitted over the PSTN-portion of the cellular fax call using a "1-D" fax compression scheme. However, fax information is transmitted over the cellular-portion of the cellular fax call using a "2-D" fax compression scheme and a data modulation as specified in AT&T Paradyne's "Enhanced Throughput Cellular" (ETC) Protocol. The fax terminal equipment at the cellular end of the cellular fax call is configured to perform fax compression/decompression using the "2-D" fax compression scheme. The PSTN-side modem of the cellular modem pool performs the translation between the "2-D" and "1-D" fax compression schemes transmitted on the cellular-side and PSTN-side, respectively.

10 Claims, 4 Drawing Sheets

USE OF COMPRESSION TO IMPROVE THE SENDING OF FAXES OVER ANALOG CELLULAR

BACKGROUND OF THE INVENTION

The present invention relates to facsimile communications over wireless links, and, more particularly, to facsimile (fax) communications over an analog cellular communications channel.

Today, the North American cellular system is predominantly an analog system sometimes referred to as AMPS (Advanced Mobile Phone Service). Although fax communications can take place over an AMPS cellular communications channel, there are some "idiosyncrasies" of fax communications over an AMPS cellular channel that affect the reliability of a fax/cellular connection (hereafter referred to as cellular fax). For instance, a fax receiver provides "delayed feedback" on any error detection and correction to a corresponding fax transmitter. This "delayed feedback" is due, in part, to the fact that fax handshaking and modulation schemes are "half-duplex," and also because of fax error correcting requirements like the "Error Correction Mode" (ECM) as defined in International Telecommunication Union (ITU) fax standards like T.4 (fax encoding standard) and T.30 (fax handshaking procedures). In ECM, transmission of error information from a fax receiver to the corresponding fax transmitter is delayed until after 255 frames of fax information are received. Unfortunately, since there are generally more errors in the cellular communications environment, the effect of this "delayed feedback" is that a cellular fax call generally takes longer to complete than when only land-line connections are involved.

In addition to the above-mentioned "delayed feedback" problem, the cellular fades and hits, which characterize the impairments of the cellular communications channel, can cause a loss of carrier or a large burst of errors. However, a fax modem, generally speaking, is not tolerant to bad line conditions and will tend to immediately disconnect if the received signal quality is not good. Consequently, cellular fades and hits may cause a fax modem to abruptly disconnect.

As a result of the above, it can be observed that the problems to solve in sending fax over cellular communications channels are: enhance the quality of the received fax, i.e., lower the Bit Error Rate (BER), enhance the reliability of the fax transfer, i.e., reduce the number of abrupt disconnects, and enhance the overall speed, or throughput, of the fax transfer.

One approach to improving cellular fax transmission is the use of digital cellular techniques instead of the analog-based AMPS. In the digital approach, a full-duplex digital communications channel is used for the cellular portion of the cellular fax call. In other words, there is no analog modem at the cellular end. Consequently, there are no corresponding fax handshaking and modulation techniques over the cellular portion of the cellular fax call. In this approach, fax-capable terminal equipment at the mobile end of the cellular fax call transmits fax information in digital form over a full-duplex digital cellular channel to a far-end fax-capable modem in a Mobile Switching Center (MSC). The far-end fax-capable modem then establishes the traditional analog-based fax call over the land-line portion of the cellular fax call. The fax-capable terminal equipment at the mobile end communicates directly with the far-end fax-capable modem in the MSC since there is no analog modem at the cellular end.

SUMMARY OF THE INVENTION

In accordance with the inventive concept, I have realized that one can more fully utilize an analog cellular communications channel during a fax transmission by using a higher-level fax compression scheme over the cellular link than is used over the PSTN communications channel. This type of operation can result in faster transmission of faxes over the analog cellular communications channel, which in turn results in less cost and higher reliability for the user.

In an embodiment of the invention, an MSC includes a cellular modem pool that comprises a number of pairs of modems in which the data terminal equipment (DTE) ports of each modem pair are cross-connected in a "back-to-back" fashion. This allows the two modems of each pair to interchange data via their DTE ports and thereby isolate that portion of the cellular fax call over the cellular communications channel from that portion of the cellular fax call through the PSTN. Fax information is transmitted over the PSTN-portion of the cellular fax call using a "1-D" fax compression scheme. However, fax information is transmitted over the cellular-portion of the cellular fax call using a "2-D" fax compression scheme and a data modulation as specified in AT&T Paradyne's "Enhanced Throughput Cellular" (ETC) Protocol. The fax terminal equipment at the cellular end of the cellular fax call is configured to perform fax compression/decompression using the "2-D" fax compression scheme. The PSTN-side modem of the cellular modem pool performs the translation between the "2-D" and "1-D" fax compression schemes transmitted on the cellular-side and PSTN-side, respectively.

DETAILED DESCRIPTION

Figure 1:
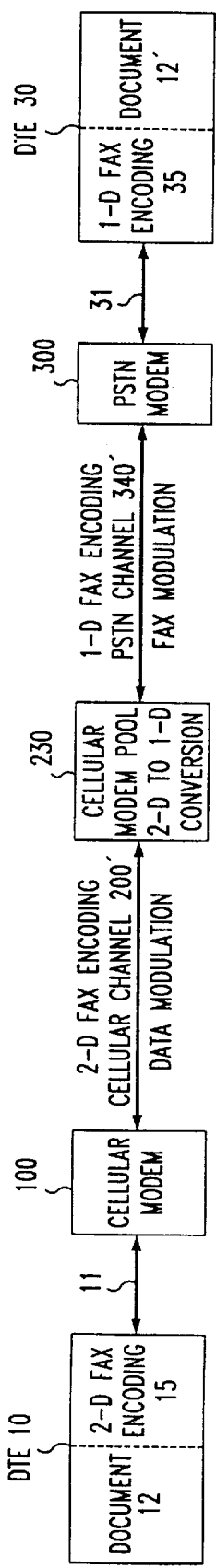
FIG. 1 shows an illustrative high-level block diagram of a cellular communications system embodying the principles of the invention.

As background, it should be noted that fax transmission is governed by a number of standards. For example, the following standards specify the fax data rate and modulation schemes: ITU V.17 defines half-duplex 14.4 kbps modulation; ITU V.29 defines half-duplex 9.6 kbps modulation; and ITU V.27ter defines half-duplex 4.8 kbps modulation. In addition to the specification of the fax data rate and modulation schemes, ITU T.4 defines the fax image encoding scheme, generally know as Group 3. Most fax equipment or services currently provided are Group 3 faxes. Group 2 and Group 1 fax schemes, as specified by ITU T.3 and T.2, respectively, are much older, slower and simpler. As a result, for the purposes of the following description, Group 3 fax is assumed. Finally, ITU V.21 channel 2 specifies a 300 bps frequency-shift-keying (FSK) modulation used during fax handshaking procedures, which is specified in ITU T.30. The latter defines five phases of a fax call: call establishment, pre-message, message transmission, post message, and call release. Fax handshaking occurs during all phases except the message transmission phase, during which time the Group 3 encoded data is transmitted using one of the above mentioned fax modulation schemes. The function of handshaking, among other things, is to allow each fax endpoint to determine the capabilities of the opposite fax endpoint such as highest supported data rate, page resolution, page size, etc. It should be noted that the ITU T.30 fax handshaking protocol allows for manual operation, where a user can originate or answer a call using a phone connected to the fax device, and then switch to fax mode; and an automatic mode of operation. For the purposes of the examples below, it is assumed that all fax equipment operate in automatic mode.

In addition to the above fax standards, two fax standards define the "class" of fax equipment by specifying the distribution of fax functionality between the DTE and data communications equipment (DCE). Standard EIA/TIA-578 defines Class 1 fax, where the DTE is responsible for providing ITU T.30 and T.4 functionality, while the DCE does the modulation, etc. In comparison, standard EIA/TIA-592 defines Class 2 fax, where the DTE is responsible for ITU T.4 only, while the DCE provides ITU T.30 functionality in addition to the modulation, etc. For the purposes of the following description, fax Class 2 is assumed.

In Group 3 fax, the DTE, which is responsible for ITU T.4 functionality, determines the type of fax encoding, or fax compression, scheme by negotiating with the opposite fax endpoint during the above-mentioned handshaking. One type of fax encoding, or fax compression, is termed "1-D," which compresses one line at a time of an image, or document. Another type of fax compression is termed "2-D," which processes multiple lines of an image, or document. For example, "2-D" fax encoding compresses information on a current line of the document by taking into account what has changed from the previous line of the document. Generally speaking, a 30 to 40% increase in data throughput occurs when using "2-D" fax encoding.

As noted above, a fax DTE negotiates with an opposite fax DTE to determine the type of fax encoding to use. However, and in accordance with the inventive concept, I have realized that one can more fully utilize a cellular communications channel during a fax transmission by using a higher-level fax compression scheme over the cellular link independent of the fax compression scheme used over the PSTN communications channel. This type of operation can result in faster transmission of faxes over the cellular communications channel, which in turn results in less cost and higher reliability for the user.

An illustrative high-level block diagram of a cellular communications system embodying the principles of the invention is shown in FIG. 1. For the moment, it is assumed that a cellular fax call has already been established between the cellular fax endpoint, as represented by DTE 10 and cellular modem 100, and the PSTN fax endpoint, as represented by DTE 30 and PSTN modem 300. Both fax endpoints conform to class 2 fax. The term "cellular user" is associated with the cellular fax endpoint and the term "PSTN user" is associated with the PSTN fax endpoint. It is assumed that DTE 10 is a personal computer, e.g., a laptop, configured with fax application software 15 that is capable of transmitting or receiving fax information via line 11, which is coupled to cellular modem 100. Similarly, it is assumed for simplicity that DTE 30 is also representative of a personal computer. It should be noted that the combination of a modem and DTE, e.g., PSTN modem 300 and DTE 30, can equivalently represent a fax machine with an integrated modem. The cellular fax call will be described in the context of transmitting fax information, e.g., document 12, from DTE 10 to DTE 30. Although not described herein, the inventive concept also applies to a call originating from a point within the PSTN network to a cellular endpoint.

In this illustrative embodiment of the invention, fax application software 15 executing in DTE 10 is independently configured of the opposite fax endpoint to produce a higher-level compression bit map of an image, or document, that is to be transmitted by fax. In particular, fax application software 15 is appropriately modified to always perform "2-D" fax encoding of a fax document, or image, as represented by document 12, independent of the encoding of the opposite fax endpoint. This can accomplished, for example, by providing a configuration option in fax application software 15 to either negotiate the fax encoding (as performed in the prior art) or to simply specify the type of fax encoding. In this context, it is assumed that fax application software 15 is configured to only perform "2-D" fax encoding. As a result, fax application software 15 of DTE 10 provides an encoded fax signal representing "2-D" fax encoding to cellular modem 100 via line 11. The latter represents the signaling, electronics, and wiring, for conforming to a DTE/DCE interface standard like EIA RS-232. However, it should be realized that even though fax application software 15 is configured to only use "2-D" fax encoding, fax application software 15 still negotiates the fax connection with the opposite fax endpoint as in the prior art—it simply ignores the negotiated fax encoding.

In accordance with the inventive concept, cellular modem 100 transmits the "2-D" fax encoded signal according to a standard data modulation—not a fax modulation—over cellular channel 200', which is described further below and is representative of the mobile transceiver, cellular channel, cell site transceiver, etc. The data modulation is, illustratively, the "Enhanced Throughput Cellular" (ETC) protocol, available from AT&T Paradyne. The ETC protocol is a cellular-oriented protocol that is better suited to combating the effects of the cellular environment and provides full-duplex data communications over the cellular channel.

Cellular modem pool 230 receives the "2-D" fax encoded signal. Cellular modem pool 230 comprises a number of pairs of back-to-back modems (described below). The use of cellular modem pool 230 allows the cellular-side of the cellular fax call to communicate data using the above-mentioned ETC protocol and the PSTN-side of the cellular fax call to use a traditional fax protocol like ITU V.17. In accordance with the invention, cellular modem pool 230 performs a "2-D" to "1-D" conversion to transmit a "1-D" fax encoded signal using a standard fax modulation over PSTN channel 340' (described below) to PSTN modem 200. The latter recovers the "1-D" fax encoded signal and provides this signal to DTE 30, which, using fax application software 35, recovers document 12'. It should be noted that no modification to the equipment of the PSTN fax endpoint is required.

Figure 2:
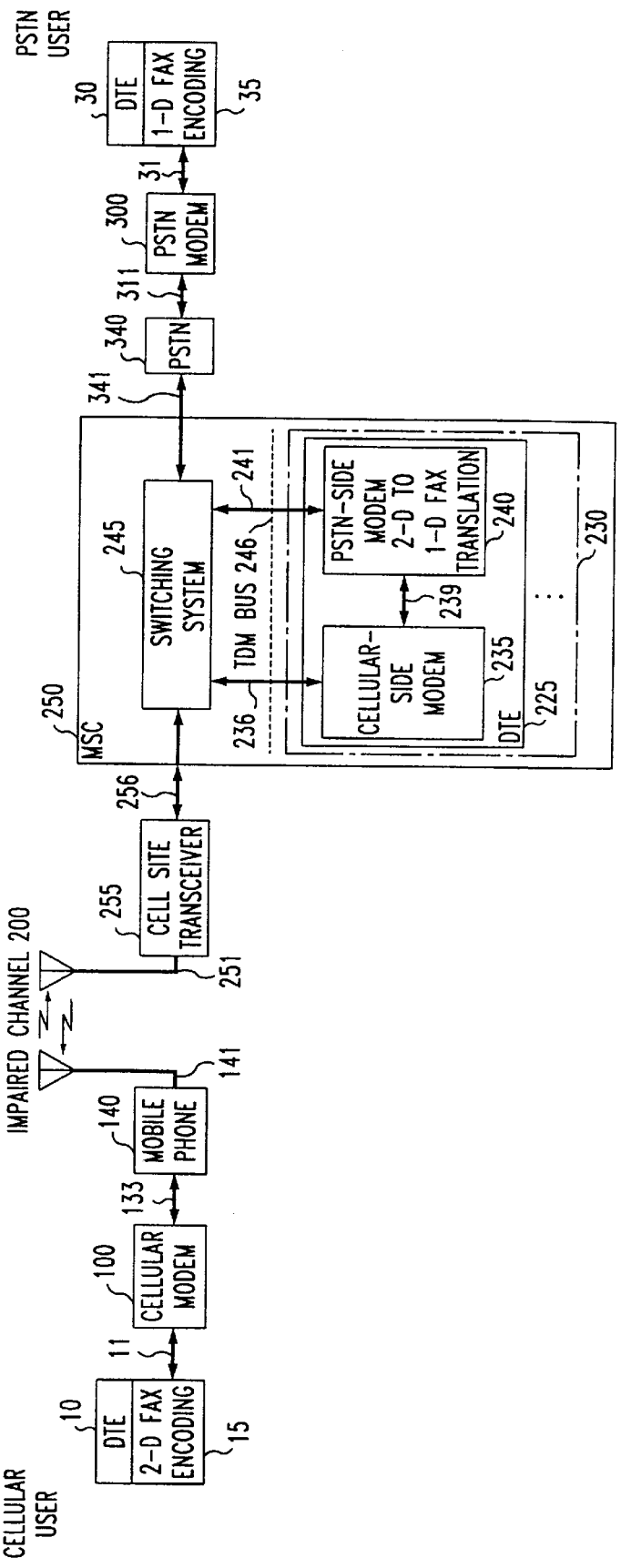
FIG. 2 shows a more detailed block diagram of the cellular communications system of FIG. 1.

A more detailed block diagram of the invention is shown in FIG. 2. As described above, DTE 10 provides a "2-D" fax encoded signal via line 11 to cellular modem 100. The latter provides a modulated data signal for transmission to mobile phone 140, via line 133. As known in the art, line 133 may include an RJ11 adapter for coupling the DCE interface of cellular modem 100 to the local signaling interface of the mobile phone. The cellular transceiver (not shown) of mobile phone 140 further modulates the signal provided by cellular modem 100 onto a cellular carrier, which is transmitted to cell site transceiver 255, via impaired channel 200. Cell site transceiver 255 demodulates the received cellular signal to provide a received digital version of the modulated data signal to MSC 250 via line 256, which is typically a T1 facility.

MSC 250 includes switching system 245 and cellular modem pool 230. The latter comprises a number of pairs of back-to-back modems as represented by modem pair 225. As known in the art, switching system 245 provides the received digital version of the modulated data signal to modem pair 225 of cellular modem pool 230, via line 236. In accordance with the inventive concept, modem pair 225 converts the "2-D" fax encoded signal provided by DTE 10 to a "1-D" fax encoded signal and provides a modulated fax signal for transmission over the PSTN portion of the cellular fax call. Modem pair 225 provides this modulated fax signal to the PSTN portion of the cellular fax call via line 241. The PSTN portion of the cellular fax call is represented by PSTN facility 341, PSTN 340, and line 311, which represents the local-loop coupling PSTN modem 300 to a local exchange carrier (not shown) included within PSTN 340. It should be noted that lines 236 and 241 have been shown as separate lines for simplicity. However, lines 236 and 241 are typically representative of allocated time slots of time-division multiplexed bus 246 that couples each modem pair of cellular modem pool 230 to switching system 245.

Each modem of modem pair 225 is known in the art as a "mu-law" modem because each modem couples directly to the above-mentioned time-division multiplexed bus as represented by lines 236 and 241. Modem pair 225 comprises cellular-side modem 235 and PSTN-side modem 240, both of which are coupled together via their DTE interfaces as represented by line 239. As described earlier, cellular-side modem 235 and cellular modem 100 terminate the cellular portion of the cellular fax call, while PSTN-side modem 240 and modem 300 terminate the PSTN portion of the cellular fax call. In accordance with the invention, this allows cellular-side modem 235 and cellular modem 100 to communicate data using a cellular-oriented data protocol like AT&T Paradyne's ETC protocol, and for PSTN-side modem 240 and modem 300 to communicate data using a more traditional fax protocol like V.17.

Figure 3:
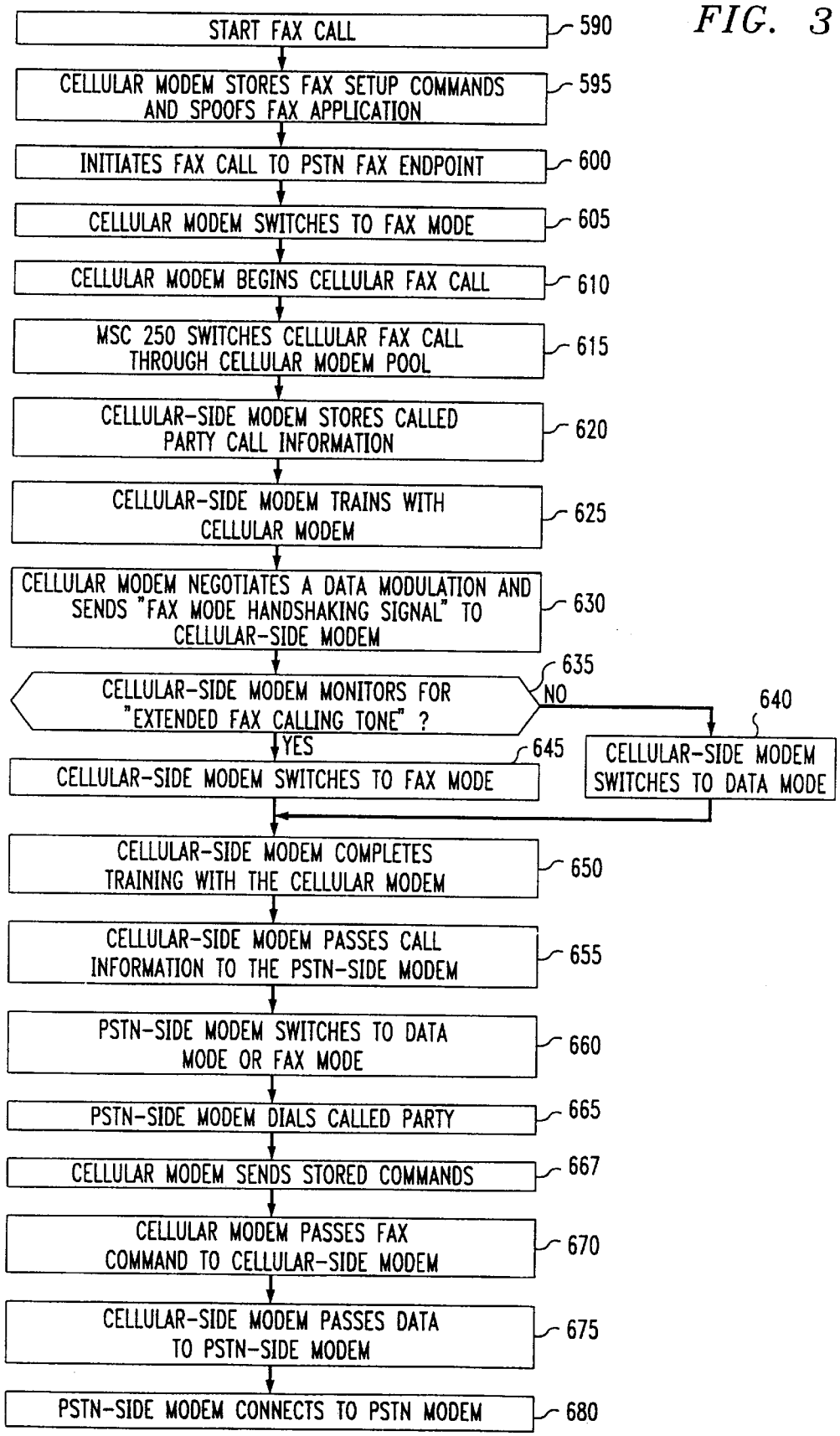
FIG. 3 shows a flow diagram for processing a fax call in accordance with the principles of the invention.

Having described the data flow through an established cellular fax call, the fax call processing in accordance with the principles of the invention is now described. It is assumed that the cellular user initiates the fax call and desires to utilize cellular modem pool 230. An illustrative flow diagram embodying the principles of the invention is shown in FIG. 3. In step 590, fax application software 15 starts the fax call by sending a sequence of "AT-type commands" to cellular modem 100. This initial sequence of commands refers to the "setup" portion of the subsequent fax call. In accordance with the principles of the invention, cellular modem 100 buffers this setup sequence of "AT-type commands" and spoofs fax application software 15 in step 595. That is, cellular modem 100 provides the necessary responses to fax application software 15 just like a regular fax call was being initiated notwithstanding the fact that cellular modem 100 is only buffering these "AT-type commands" for latter transmission. It is assumed that an appropriate buffer is included within cellular modem 100 to provide this storage.

In step 600, the cellular user initiates a cellular fax call to the opposite PSTN fax endpoint. For example, the cellular user dials both an access code, e.g., "*FAX," and a telephone number associated with the called party, who is represented by the PSTN fax endpoint. To perform the dialing function, the cellular user enters the well-known "AT dialing command," via DTE 10, using fax application software 15. Upon receiving the above-mentioned "AT dialing command," cellular modem 100 switches into a fax mode of operation in step 605. (It should be noted that it is well-known that the type of transmission, fax or data, is communicated to a corresponding modem, or DCE, via an "AT-type command." Consequently, a cellular modem embodying the principles of this invention can transition to a fax mode of operation upon detection of FAX-specific "AT command" parameters. (For example, even a pre-stored telephone number within the modem could be associated with a facsimile endpoint.) Cellular modem 100 begins the cellular fax call in step 610 by transmitting the "*FAX" and received telephone number to mobile phone 140, which sets up a cellular telephone call with switching system 245 of MSC 250.

It is assumed here that MSC 250 does not provide a transparent call progress feature that allows the cellular user to hear the call progress on the PSTN-side of the cellular fax connection. A transparent call progress feature is described in the co-pending, commonly assigned, U.S. patent application of Exner et al entitled "Transparent Call Progress," Ser. No. 08/380872, filed on Jan. 30, 1995. If a mobile switching center does provide a transparent call progress feature then it is assumed that the mobile switching center is appropriately modified so that a cellular user can enable or disable this feature on a per-call basis, e.g., by entering a predefined special (*) code as is known in the art, e.g., as is currently done to enable and disable call-waiting notification.

In step 615, switching system 245 detects the "*FAX" access code and switches the incoming call through cellular modem pool 230. In this context, "*FAX" is similar to "*DATA," as currently used, to alert switching system 245 to use the cellular modem pool. As known in the prior art, switching system 245 selects an idle back-to-back modem pair of cellular modem pool 230 and assigns time slots as represented by lines 236 and 241 to the selected modem pair. In this example, the selected pair of back-to-back modems is represented by modem pair 225.

Once modem pair 225 of cellular modem pool 230 is switched in, switching system 245 provides a six digit code to modem pair 225 via line 236. As known in the art, this six digit code is a reference number, e.g., a pointer, associated with the actual telephone number, which is stored within switching system 245. In addition, this six digit code is represented by the well-known "multi-frequency" (MF) signaling, i.e., each digit is represented by a different set of frequency pairs. For example, upon detecting the existence of a MF signal sequence, cellular-side modem 235 converts the MF signal sequence to a data string, which, in this example, represents the six digit code. Cellular-side modem 235 temporarily stores the six digit code in a buffer (not shown) in step 620. In step 630, cellular modem 100 provides a "fax mode handshaking signal," e.g., a tone, to cellular-side modem 235, i.e., an "extended fax calling tone." The latter indicates that the subsequent data connection will transport fax information.

In step 635, cellular-side modem 235 monitors the handshaking for this "fax mode handshaking signal." If no "fax mode handshaking signal" is detected, cellular-side modem 235 switches to data mode in step 640 and, if necessary transparent call progress is enabled. However, if a "fax mode handshaking signal" is detected, cellular-side modem 235 switches to fax mode in step 645. In accordance with the invention, cellular-side modem 235 completes training in step 650 to subsequently communicate data over the cellular portion of the cellular fax call using a data modulation, e.g., the above-mentioned ETC protocol. As a result, during the subsequent "message transmission" phase of the fax call, cellular-side modem 235 receives ITU T.4 data, through ITU V.32 type data modulation, and passes this fax data along to PSTN-side modem 240, as described below. (It should be noted that if V.42bis compression is used between the modems over the cellular-portion of the connection an additional compression of the fax data occurs in accordance with the principles of the invention).

In step 655, cellular-side modem 235 communicates call information with PSTN-side modem 240 by passing a predefined "AT-command" sequence that includes the above-described six digit code and identifies whether the call is a fax call or a data call. In response, PSTN-side modem 240 similarly switches to a respective data mode or fax mode of operation in step 660. Also, in step 665, PSTN-side modem 240 goes "off-hook" and regenerates the MF signal sequence on line 241 to dial the called party. Upon detecting the six digit code, switching system 245 retrieves, and dials, the called party telephone number.

After completing training, cellular modem 100 sends the above-mentioned stored "AT-type commands" representing setup information to the cellular-side modem in step 667. Also, because cellular modem 100 has switched to fax mode, cellular modem subsequently passes all "AT-type commands" from DTE 10 to cellular-side modem 235 in step 670 once on-line. In this example, all FAX commands from DTE 10 are classified as remote commands and are transmitted to cellular-side modem 235 in step 670. Since DTE FAX commands are well-defined, cellular modem 100 transmits them as data directly to cellular-side modem 235 instead of operating on them. (Note, in the off-line fax mode, local "AT-commands" are operated on by the cellular modem, while remote commands are stored and transmitted to a far-end endpoint.) This allows fax-capable terminal equipment at the mobile end to communicate directly with far-end fax-capable PSTN modem 240 in the MSC. In this context, cellular-side modem 240 passes all recovered data to PSTN-side modem 240 in step 675. As a result, the cellular portion of the connection acts like an extended RS-232 cable—in other words, any PC FAX commands and data from DTE 10 act upon PSTN-side modem 240 in the MSC modem pool. Similarly, any data transmitted by PSTN modem 300 is transmitted back to DTE 10. In effect, cellular modem 100 spoofs DTE 10 that a fax transmission is taking place when actually cellular modem 100 is using a data modulation and passing through any "FAX AT commands" to cellular modem pool 230. As a result, DTE 10 negotiates the fax call with DTE 30 via PSTN-side modem 240, which completes the call connection to PSTN modem 300 as in the prior art in step 680.

Figure 4:
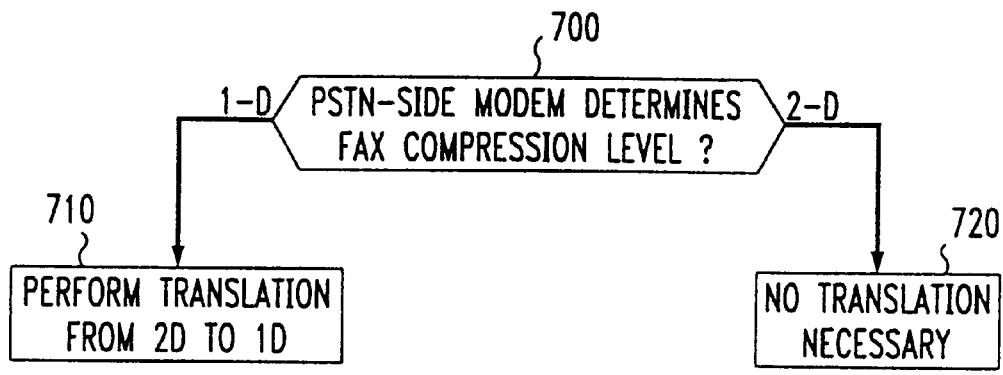
FIG. 4 shows an illustrative flow diagram for use in a PSTN-side modem of the cellular modem pool shown in FIG. 2.

In the process of establishing the fax call, PSTN-side modem 240 not only performs (as in the prior art) the fax handshaking with PSTN modem 300 but also monitors this control information to determine the type of fax encoding that is to be used. As noted above, fax application software 15 always provides "2-D" fax encoded data. Consequently, and in accordance with the principles of the invention, PSTN-side modem 240 translates the "2-D" fax encoded data into "1-D" fax encoded data if necessary. This is shown in FIG. 4, which illustrates a flow diagram for use within PSTN-side modem 240.

In step 700, PSTN-side modem 240 monitors the above-mentioned fax handshaking between DTE 10 and DTE 30 to determine the level of fax compression negotiated over the PSTN portion of the cellular fax call. If the level of fax compression is "1-D," then PSTN-side modem 240 additionally translates the T.4 encoded "2-D" data from DTE 10 to T.4 encoded "1-D" data in step 710. On the other hand, if the level of fax compression negotiated over the PSTN portion of the cellular fax call is "2-D," then PSTN modem 240 performs no translation in step 720.

It should be noted that PSTN-side modem 240 is not run-time challenged in performing the translation of step 710 since it is not doing more complex data modulations like V.42bis, V.42, etc. That is, PSTN-side modem 240 has enough run time available to do the "2-D" to "1-D" compression translation. However, even if PSTN-side modem 240 did run out of processing time, the corresponding fax transmission would simply be slowed down. Even in this latter scenario, total throughput would still probably exceed the case where no "2-D" compression was used over the cellular portion of the cellular fax call. In addition, since the cellular link is generally more impaired than the PSTN link, the cellular link, normally, will be slower—i.e., the cellular link will be the bottleneck. Consequently, the PSTN-side modem is idle, waiting for data, much of the time. For example, the PSTN-side modem can support 14,400 bps using ITU V.17, in comparison, the cellular link may typically be at 4,800 bps using ETC.

Figure 5:
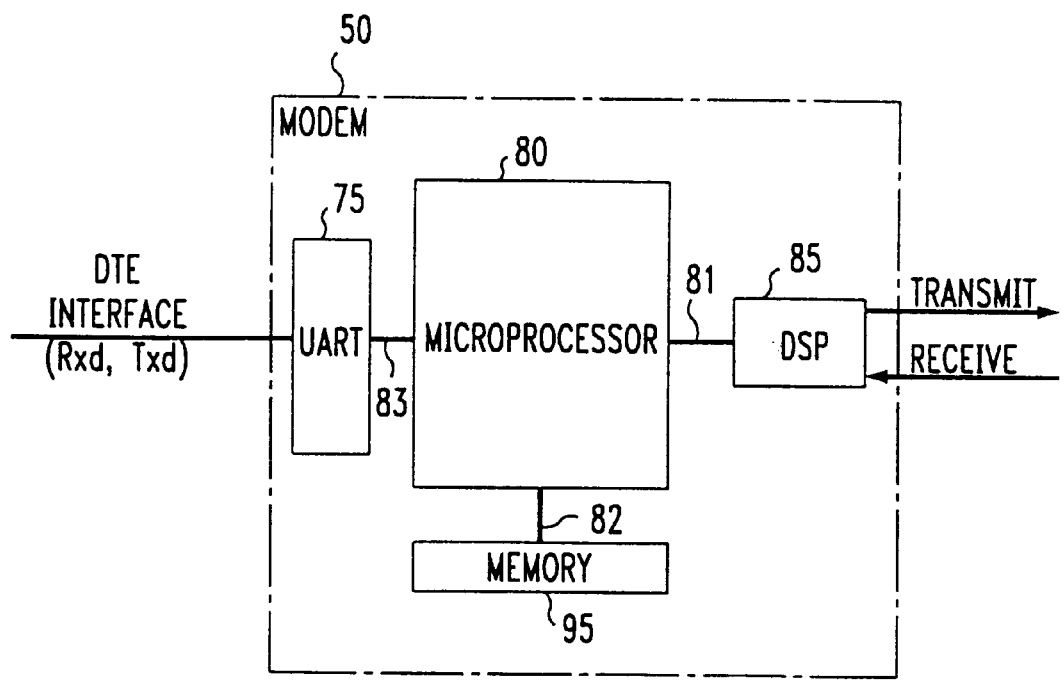
FIG. 5 shows an illustrative block diagram of a modem for use in the cellular communications system of FIG. 2.

FIG. 5 shows an illustrative high-level block diagram of a modem in accordance with the principles of the invention. In particular, modem 50 includes a microprocessor 80, memory 95, a digital signal processor 85, e.g., for providing the tone generator/detector and other modem functions mentioned above, and universal/asynchronous receive transmit (UART) 75 for providing the DTE interface. Microprocessor 80 is coupled to DSP 85 via line 81, which represents, address, data, control, and status leads. In the contexts of this invention, it is assumed that the abovedescribed flow charts of FIGS. 3 and 4 are implemented in software. For example, the flow chart of FIG. 4 is a part of the program stored in memory 95 and executed by microprocessor 80 when FIG. 5 represents PSTN-side modem 240.

Figure 6:
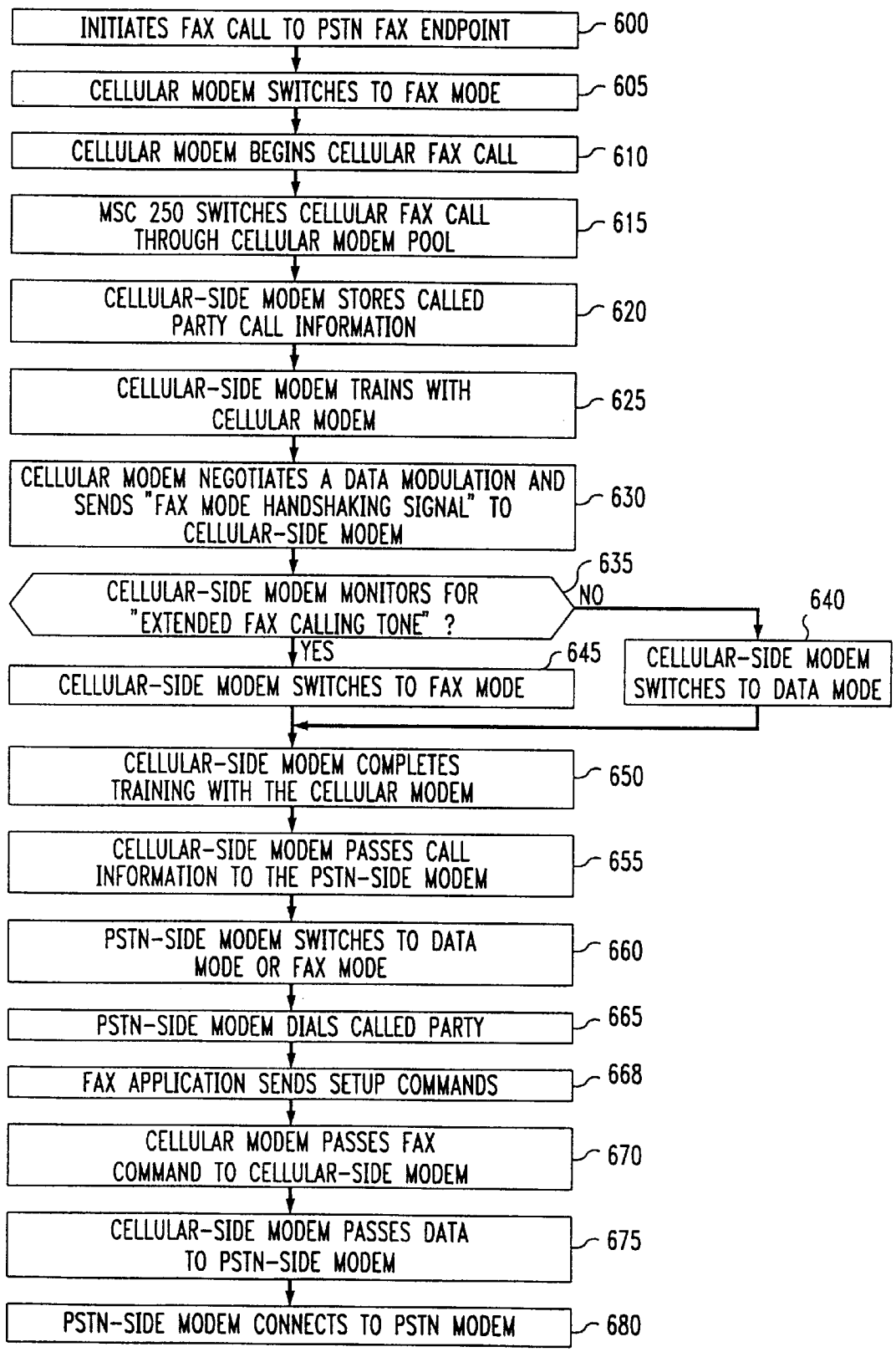
FIG. 6 shows another flow diagram for processing a fax call in accordance with the principles of the invention.

As can be observed from the above description, a fax call comprises a setup (off-line) portion and an on-line portion, during which sequences of "AT-type commands" are passed to the respective data communications equipment. As described above, it is necessary for cellular-modem 100 to both buffer the off-line "AT-type commands" and spoof the respective fax application software that a fax call is progressing. However, an alternative implementation of is possible if a change is made to fax application software 15 such that fax application software 15 can be configured to an "extended fax mode of operation." The latter is accomplished by allowing a user to configure fax application software 15 in a similar fashion to setting other data communications equipment options. Once fax application software 15 is configured for an "extended fax mode of operation," the flow chart of FIG. 3 is simplified to that shown in FIG. 6. The latter is identical to FIG. 3 except for the deletion of steps 590, 595, and 667, and the addition of step 668. In this "extended fax mode of operation," the fax call setup sequence is changed. In particular, fax application software 15 first establishes the fax connection and then transmits the above-mentioned off-line "AT-type commands" to cellular modem 100. As a result, steps 590 and 595 have been deleted and cellular modem 100 does not have to buffer the off-line "AT-type commands." Similarly, step 667 has been deleted and replaced by step 668, where the respective DTE equipment now sends the off-line "AT-type commands" after the call is setup. This modification removes any additional buffering and the requirement for cellular modem 100 to spoof fax application software 15 during a portion of the fax call.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was illustrated in the context of a personal computer and a distinct cellular modem, it should be realized that these can be integrated into one physical arrangement for the sending and receiving of faxes in accordance with the principles of the invention. Also, although "2-D" fax encoding was used as an example of a higher-level fax compression, the inventive concept includes the notion of transmitting a higher level compression scheme over the analog cellular portion than the level of compression over the PSTN portion of the cellular fax call—whatever the form of the higher-level compression. In fact, this higher level compression can simply be V.42bis.

In addition, although the invention was described in terms of two-stage dialing, i.e., first the cellular portion of the connection was established and then the PSTN portion of the data connection was established, the inventive concept could be modified to work with single stage dialing. Similarly, although described in the context of dialing via an "AT command," dialing could be performed manually, e.g., via a mobile phone keypad, with concomitant modifications in the above-described initialization procedure. It should also be realized that the inventive concept can be extended to other embodiments. For example, the cellular portion of the fax call can be established using fax modulation techniques, as known in the art, except that the fax modems at either endpoint of the cellular portion of the fax call transmit "2-D" fax encoding, while a lower level of fax encoding is used over the PSTN portion of the fax call.

What is claimed:

1. A method for communicating facsimile information, the method comprising the steps of:
    establishing a facsimile data connection between a first facsimile endpoint and a second facsimile endpoint; and
    communicating the facsimile information over a first portion of the facsimile data connection using data modem modulation of facsimile encoding that is more densely compressed than a level of facsimile encoding used over a second portion of the facsimile data connection, wherein the first portion of the facsimile data connection comprises an analog cellular communication channel.

2. The method of claim 1 wherein the second portion of the facsimile data connection comprises a public-switched network communications channel.

3. The method of claim 1 wherein the more dense compression of facsimile encoding over the first portion of the facsimile data connection is "2-D" encoding and the compression of facsimile encoding over the second portion of the facsimile data connection is "1D-" encoding.

4. The method of claim 1 wherein the more dense facsimile encoding over the first portion of the facsimile data connection is a V.42bis compression.

5. A method for communicating facsimile information, the method comprising the steps of:
    compressing facsimile information for transmission using data modern modulation over an analog cellular communications channel to a land-line communications channel in such a way that the compression over the analog cellular channel is higher than the compression over the land-line communications channel; and
    communicating the compressed facsimile information using data modem modulation over the analog cellular communication channel to the land-line communication channel.

6. A system for communicating facsimile data between a first and second remote facsimile machines comprising:
    a communication link interconnecting the first and second facsimile machines for communication, the communication link having an analog cellular portion and a land-line portion, the first facsimile machine being in direct communication with the cellular portion and the second facsimile machine being in direct communication with the land-line portion;
    a switching center having at least two modems connected in back-to-back fashion, one of the back to back modems in direct communication with the cellular portion and the other back-to-back modem in direct communication with the land-line portion;
    first encoding means including a buffer configured to receive facsimile data from the first facsimile machine for encoding facsimile data into a data modem modulation at a first compression level for transmission over the cellular portion;
    second encoding means for encoding facsimile data into a facsimile modulation at a second compression level for transmission over the land-line portion, the first compression level being further compressed than the second compression level;
    first converting means at the switching center for converting the facsimile data from the first compression level to the second compression level in response to a facsimile transmission from the first facsimile machine to the second facsimile machine; and
    second converting means at the switching center for converting the facsimile data from the second compression level to the first compression level in response to a facsimile transmission from the second facsimile machine to the first facsimile machine.

7. The system as defined in claim 6, wherein the land-line portion is a public switched telephone network (PSTN).

8. The system as defined in claim 6, wherein the first encoding means encodes the facsimile data as "2-D" encoding.

9. The system as defined in claim 6, wherein the second encoding means encodes the facsimile data as "1-D" encoding.

10. The system as defined in claim 6, wherein the first encoding means encodes the facsimile data as V.42bis.

* * * * *

UNITED STATES PATENT AND TRADEMARK OFFICE
CERTIFICATE OF CORRECTION

PATENT NO. : 5,920,402
DATED : July 6, 1999
INVENTOR(S) : Scott

It is certified that error appears in the above-identified patent and that said Letters Patent is hereby corrected as shown below:

Col. 4, line 14, after "can" insert --be--.
Col. 4, line 52, replace "200" with --300--.
Col. 6, line 8, before " Consequently" insert --)--.
Col. 7, line 40, replace "240" with --235--.
Col. 8, line 47, after "of" insert --this--.

Signed and Sealed this

Sixth Day of June, 2000

*Attest:*

Q. TODD DICKINSON

*Attesting Officer*     *Director of Patents and Trademarks*